(12) United States Patent
Chen (10) Patent No.: US 11,050,805 B2
(45) Date of Patent: Jun. 29, 2021

(54) METHOD OF CONTROLLING STREAM BUFFER IN MEDIA PLAYBACK DEVICE AND RELATED BUFFERING DEVICE

(71) Applicant: Realtek Semiconductor Corp., HsinChu (TW)

(72) Inventor: Chun-Yi Chen, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/703,820

(22) Filed: Dec. 4, 2019

(65) Prior Publication Data

US 2020/0213372 A1 Jul. 2, 2020

(30) Foreign Application Priority Data

Dec. 28, 2018 (TW) ................................ 107147634

(51) Int. Cl.
*G06F 13/00* (2006.01)
*H04L 29/06* (2006.01)

(52) U.S. Cl.
CPC ........ *H04L 65/4084* (2013.01); *H04L 65/602* (2013.01); *H04L 65/607* (2013.01); *H04L 65/80* (2013.01)

(58) Field of Classification Search
CPC . H04L 65/604; H04L 65/602; H04L 65/4084; H04L 65/80; H04L 65/607
USPC .......................... 709/231–235, 230, 213–215
See application file for complete search history.

(56) References Cited

U.S. PATENT DOCUMENTS

| 7,433,946 | B2 * | 10/2008 | Shen | ................ | H04L 29/06027 |
| | | | | | 709/223 |
| 8,619,868 | B2 * | 12/2013 | Hannuksela | ......... | H04N 19/597 |
| | | | | | 375/240.25 |
| 8,914,534 | B2 * | 12/2014 | Braness | ............... | G11B 27/005 |
| | | | | | 709/231 |
| 9,407,932 | B2 * | 8/2016 | Samuelsson | ........... | H04N 19/85 |
| 9,450,997 | B2 * | 9/2016 | Luby | ....................... | H04L 65/60 |
| 9,848,203 | B2 * | 12/2017 | Samuelsson | ......... | H04N 19/423 |
| 2006/0036759 | A1 * | 2/2006 | Shen | ................... | H04L 65/4076 |
| | | | | | 709/234 |
| 2008/0205511 | A1 * | 8/2008 | Hannuksela | ......... | H04N 19/597 |
| | | | | | 375/240.01 |
| 2012/0173751 | A1 | 7/2012 | Braness | | |
| 2013/0227081 | A1 | 8/2013 | Luby | | |
| 2013/0227158 | A1 | 8/2013 | Miller | | |
| 2014/0161181 | A1 * | 6/2014 | Samuelsson | ......... | H04N 19/152 |
| | | | | | 375/240.12 |
| 2015/0319457 | A1 * | 11/2015 | Samuelsson | ........... | H04N 19/44 |
| | | | | | 375/240.12 |
| 2018/0115592 | A1 * | 4/2018 | Samineni | ........... | H04N 21/4661 |
| 2020/0128306 | A1 * | 4/2020 | Jackson | ............. | H04N 21/8547 |

* cited by examiner

*Primary Examiner* — Kenneth R Coulter
(74) *Attorney, Agent, or Firm* — Winston Hsu (57) ABSTRACT

A method for controlling a stream buffer in a media playback device includes: receiving a data stream from a download buffer of the media playback device at a processing rate; buffering the data stream in the stream buffer at a buffering rate; performing a pre-parsing operation on the data stream buffered in the stream buffer to obtain a pre-parsed result; and selectively adjusting at least one of the processing rate and the buffering rate according to the pre-parsed result.

16 Claims, 6 Drawing Sheets

| Timing | TL1 | TL2 | TL3 | TL4 | TL5 | TL6 | TL7 | TL8 |
|---|---|---|---|---|---|---|---|---|
| Receiving | PA1 (GOP) | PA2 | PA3 | PA4 | PA5 | PA6 | PA7 | PA8 |
| Buffering | | PA1 | PA2 | PA3 | PA4 | PA5 | PA6 | PA7 |
| Pre-parsing | | PA1 | | | | | | |
| Decoding | | PA1 | PA2 | PA3 | PA4 | PA5 | PA6 | PA7 |

FIG. 3

| Timing | TL1 | TL2 | TL3 | TL4 | TL5 | TL6 | TL7 | TL8 |
|---|---|---|---|---|---|---|---|---|
| Receiving | PA1 | PA2 (GOP) | PA3 | PA4 | PA5 | PA6 | PA7 | PA8 |
| Buffering | | PA1 | PA2 | PA3 | PA4 | PA5 | PA6 | PA7 |
| Pre-parsing | | PA1 | PA2 | | | | | |
| Decoding | | | PA2 | PA3 | PA4 | PA5 | PA6 | PA7 |

FIG. 4

| Timing | TL1 | TL2 | TL3 | TL4 | TL5 | TL6 | TL7 | TL8 |
|---|---|---|---|---|---|---|---|---|
| Receiving (DR1) | PA1 | PA2 | | | | | | |
| Receiving (DR2) | | | PA3 | PA4&5 (PA5(GOP)) | | PA6 | PA7 | PA8 |
| Buffering | | PA1 | PA2&3 | PA4&5 | | PA6 | PA7 | PA8 |
| Pre-parsing | | PA1 | PA2&3 | PA4&5 | | | | |
| Decoding | | | | | PA5 | PA6 | PA7 | PA8 |

FIG. 5

| Timing | TL1 | TL2 | TL3 | TL4 | TL5 |
|---|---|---|---|---|---|
| Receiving (DR1) | PA1 | PA2 | PA3 | | |
| Receiving (DR2) | | | | PA4&5 | |
| Receiving (DR3) | | | | | PA6&7&8 |
| Buffering | | PA1 | PA2&3 | PA4&5 | PA6&7&8 |
| Pre-parsing | | PA1 | PA2&3 | PA4&5 | PA6&7&8 |
| Decoding | | | | | |

FIG. 6

| Timing | TL1 | TL2 | TL3 | TL4 | TL5 | TL6 | TL7 |
|---|---|---|---|---|---|---|---|
| Receiving (DR1) | PA1 (GOP) | PA2 | PA3 | PA4 | PA5 | PA6 | PA7 |
| Buffering | PA1 | PA2 | PA3 | PA4 | PA5 | PA6 | PA7 |
| Pre-parsing | | PA1 | | | | | |
| Decoding | | PA1 | PA2 | PA3 | PA4 | PA5 | PA6 | PA7 |

FIG. 7

| Timing | TL1 | TL2 | TL3 | TL4 |
|---|---|---|---|---|
| Receiving (DR1) | PA1 | PA2 | PA6 | PA7 |
| Receiving (DR2) | | | PA2&6 | PA7&8 (PA8(GOP)) |
| Buffering | | PA1 | PA2&6 | PA7&8 |
| Pre-parsing | | PA1 | PA2&6 | PA7&8 |
| Decoding | | | | PA8 |

FIG. 8

| Timing | TL1 | TL2 | TL3 | TL4 | TL5 | TL6 | TL7 |
|---|---|---|---|---|---|---|---|
| Receiving (DR1) | PA1 | PA2 | PA3 (GOP) | PA4 (GOP) | PA5 | PA6 | PA7 |
| Buffering | | PA1 | PA2 | PA3 | PA4 | PA5 | PA6 |
| Pre-parsing | | PA1 | PA2 | PA3 | PA4 | | |
| Decoding | | | | PA3 (Error) | PA4 | PA5 | PA6 |

FIG. 9

METHOD OF CONTROLLING STREAM BUFFER IN MEDIA PLAYBACK DEVICE AND RELATED BUFFERING DEVICE

BACKGROUND OF THE INVENTION

1. Field of the Invention

The present invention relates generally to stream media playback, and more particularly, to a method for controlling a stream buffer in a media playback device and a related buffer device.

2. Description of the Prior Art

In recent years, due to advances in data transmission and video coding technology, media playback devices have been able to download media files remotely and play the media files in a streaming way. However, since the smoothness of stream video playback is affected by stability of transmission, a better buffering process is necessary to manage the data stream, thereby allocating the system resources of the media playback device more appropriately and improving power consumption.

In addition, common media playback devices will send data to internal decoding devices while playing a media file. Most of the decoding devices use hardware acceleration in order to synchronously improve performances of media playback and data transmission, such as replacing CPU with higher performance or faster memory. However, it is still difficult to properly use existing system resources.

SUMMARY OF THE INVENTION

With this in mind, it is one object of the present invention to provide a method of controlling a stream buffer in a media playback device and related buffer device. In various embodiments of the present invention, one or more data units that are buffered in the stream buffer will be pre-parsed, thereby to determine whether the one or more data units include video/audio information that is required by a decoding device of the media playback device. Based on a pre-parsed result, an adjustment mechanism of the present invention will selectively adjust a processing rate at which a data stream is received as well as a buffering rate at which the data stream is buffered. Moreover, when the pre-parsed result indicates a data unit does not include the video/audio information required by the decoding device, the data unit will be discarded from the stream buffer. In various embodiments, according to status of transmission between the media playback device and a video/audio source or according to a decoding result of the decoding device, the present invention performs an overall adjustment on the buffering process. With such adjustment, system resources of the media playback device can be allocated in a more reasonable way thereby to improve the power consumption.

According to one embodiment, a method for controlling a stream buffer in a media playback device is provided. The method comprises: receiving a data stream from a download buffer of the media playback device at a processing rate; buffering the data stream into the stream buffer at a buffering rate; performing a pre-parsing operation on the data stream buffered in the stream buffer to obtain a pre-parsed result; and selectively adjusting at least one of the processing rate and the buffering rate according to the pre-parsed result.

According to one embodiment, a buffer device for use in a media playback device is provided. The buffer device comprises: a receiving unit, a stream buffer and a buffer management unit. The receiving unit is arranged to receive a data stream from a download buffer of the media playback device at a processing rate. The stream buffer is coupled to the receiving unit, and arranged to buffer the data stream at a buffering rate. The buffer management unit is coupled to the stream buffer and the receiving unit, and arranged to perform a pre-parsing operation on the data stream buffered in the stream buffer to obtain a pre-parsed result and selectively adjust at least one of the processing rate and the buffering rate according to the pre-parsed result. The data stream buffered in the stream buffer is provided to a decoding device of the media playback device for decoding process.

These and other objectives of the present invention will no doubt become obvious to those of ordinary skill in the art after reading the following detailed description of the preferred embodiment that is illustrated in the various figures and drawings.

DETAILED DESCRIPTION

In the following, numerous specific details are described to provide a thorough understanding of embodiments of the present invention. However, one of skilled in the art will understand how to implement the present invention in the absence of one or more specific details, or relying on other methods, elements or materials. In other instances, well-known structures, materials or operations are not shown or described in detail in order to avoid obscuring the main concepts of the present invention.

Reference throughout this specification to "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

Figure 1:
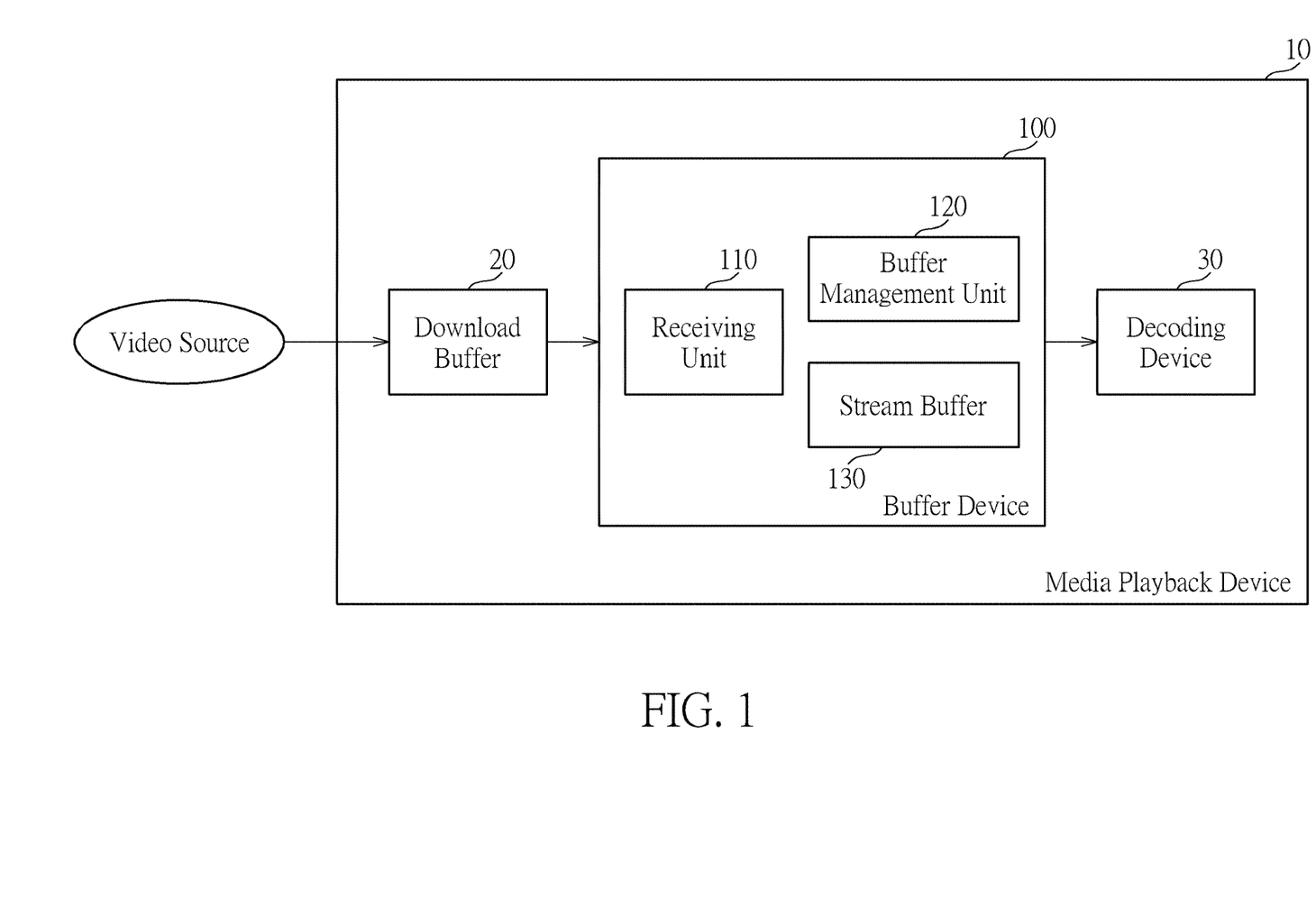
FIG. 1 illustrates a diagram of a buffer device according to one embodiment of the present invention.
Figure 2:
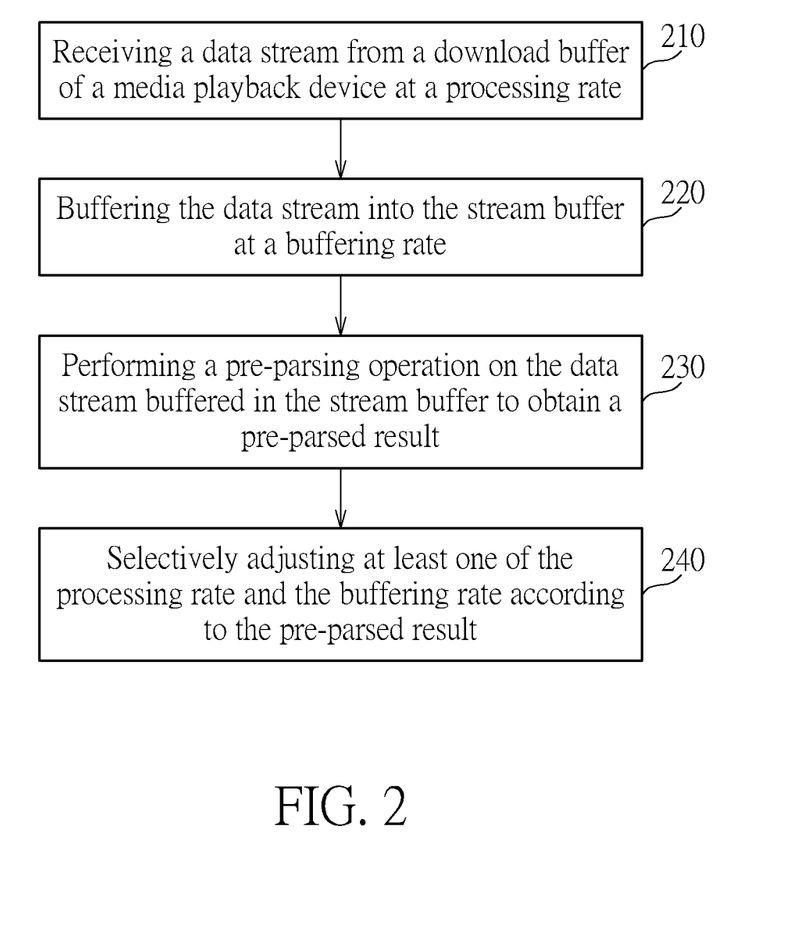
FIG. 2 illustrates how a method of the present invention applies to a stream buffer according to one embodiment of the present invention.

FIG. 1 illustrates a block diagram of a buffer device according to one embodiment of the present invention. FIG. 2 illustrates main steps regarding the buffer device during operation according to one embodiment the present invention. The buffer device 100 of the present invention can be applied to a media playback device 10 and arranged to buffer a data stream between a download buffer 20 and a decoding device 30 of the media playback device 10. The media playback device 10 could further include one or more receivers (not shown) that is/are arranged to receive a data stream DS that is associated with video/audio contents from different video/audio sources. According to various embodiments, the video/audio sources could be a file server (e.g. DLNA (Digital Living Network Alliance) server), a web media server (e.g. IPTV (Internet Protocol Television) sever) or a broadcasting station. These video/audio sources could be connected to the media playback device 10 through wired or wireless communication channels.

Moreover, the data stream DS could be video/audio information that is encoded based on H.264 or H.265 standards. However, video coding standards that are used in the data stream DS are not limitations of the present invention. After the receiver has received the data stream DS, the data stream DS will be buffered in the download buffer 20 and wait for being processed by the decoding device 30. The decoding device 30 will perform a decoding process according to the video coding standard used in the data stream DS, thereby to obtain specific frames and audios. In one embodiment, the media playback device 10 could be a TV dongle, and connected to one or more display devices and/or audio playback devices, to present the frames and audios decoded by the decoding device 30.

The buffer device 100 is intended to properly conduct data buffering between the download buffer 20 and the decoding device 30 based on different conditions, such that system resources of the media playback device 10 can be allocated more reasonably, thereby to improve the power consumption of the media playback device 10. The buffer device 100 comprises a receiving unit 110, a buffering management unit 120 and a stream buffer 130. The receiving unit 110 is arranged to receive the data stream DS from the download buffer 20 at a processing rate. The stream buffer 130 is coupled to the receiving unit 110 and arranged to buffer the data stream DS at a buffering rate. The buffering process could be software behaviors, and achieved by threads temporarily storing data. The amount of the data being temporarily stored is determined by the processing rate of the receiving unit 110. The buffer management unit 120 is coupled to the stream buffer 130 and the receiving unit 110, and arranged to perform a pre-parsing operation on the data stream DS that is buffered in stream buffer 130, thereby to obtain a pre-parsed result. According to the pre-parsed result, the buffer management unit 120 selectively requests the receiving unit 110 to adjust the processing rate or requests the stream buffer 130 to adjust the buffering rate.

Please refer to FIG. 2, which illustrates how a method of present invention applies to the stream buffer 130 according to one embodiment. At step 210, a data stream DS is received from a download buffer 20 of a media playback device 10 at a processing rate. At step 220, the data stream DS is buffered in stream buffer 130 at a buffering rate. At step 230, the data stream DS buffered in stream buffer 130 is pre-parsed to obtain a pre-parsed result. At step 240, according to the pre-parsed result, at least one of the processing rate and the buffering rate is selectively adjusted. Generally, a buffer management unit 120 of the buffer device 100 adjusts the buffering process according to whether the data stream DS includes the video/audio information required by the decoding device 30. When the data unit in the data stream DS does not include the video/audio information required by the decoding device 30, the buffer management unit 120 makes the decoding device 30 derive the required video/audio information faster by requesting the receiving unit 110 to increase the processing rate or request the stream buffer 130 to increase the buffering rate, such that video/audio decoding process can be conducted as soon as possible. When a data unit in the data stream DS does not include the video/audio information required by the decoding device 30, the buffer management unit 120 further requests the stream buffer 130 to discard the buffered data unit, thereby to avoid the decoding device 30 wasting time and hardware resources (e.g. CPU) in processing data that is not associated with video/audio information. In one embodiment, the buffer management unit 120 determines whether a payload of a data unit contains video/audio information that is required by the decoding device 30 according to a header of the data unit. For example, when the header of the data unit is associated with a picture/frame type of a group of pictures (GOP) structure, it represents that the data unit includes the video/audio information required by the decoding device 30.

In addition to adjusting the buffering process of the buffer device 100 based on contents of the data units, the buffer management unit 120 also adjusts the buffering process based on the status of transmission channels between video/audio sources and the media playback device 10, or based on decoding results of the decoding device 30, as will be explained later.

FIGS. 3-9 illustrates principles and operations of the buffer device 100 according to various embodiment of the present invention. In these embodiments, the data stream DS containing data packets, i.e., packets PA1-PAn, are firstly received by the receiver of the media playback device 10 and buffered in the download buffer 20. Based on different conditions, the buffer device 100 will buffer the data stream DS and utilize the system resources in a more effective way.

Figure 3:
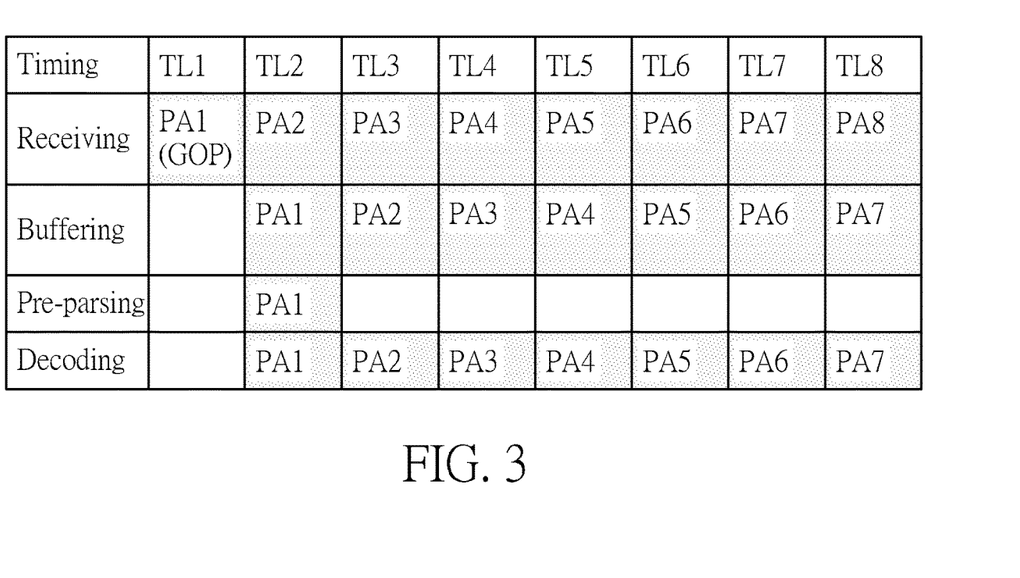
FIGS. 3-9 illustrate operations of the buffer device according to various embodiments of the present invention and are intended for explaining how a buffer management unit adjusts a processing rate of a receiving unit and a buffering rate of a stream buffer based on different conditions.

Please refer to FIG. 3. In an embodiment shown by FIG. 3, it is assumed that the first packet PA1 in the data stream DS includes an I frame of a GOP structure, wherein "I frame" represents an intra-coded reference frame/picture. Each GOP structure begins with the I frame. At the beginning of operation, a buffer size of the stream buffer 130 is configured as VOL 1 (e.g. 3 MB) and the processing rate at which the receiving unit 110 process the data stream DS is DR 1 (e.g. 2.44 MB/s). In the first time slot TL1, the receiving unit 110 receives the packet PA1 in the data stream DS at the processing rate DR1. In the second time slot TL2, the packet PA1 is buffered in the stream buffer 130. At this time, the buffer management unit 120 performs a pre-parsing operation on the packet PA1 buffered in the stream buffer 130. According to a header of the packet PA1, it is parsed out that the packet PA1 contains an I frame of a GOP structure. Therefore, the buffer management unit 120 determines that the packet PA1 includes video and audio information required by the decoding device 30. Therefore, the packet PA1 will be preserved and later decoded by the decoding device 30. After determining that the packet PA1 includes the video information, the buffer management unit 120 may not perform the pre-parsing operation on the following packets. This is because frames of a GOP structure are successive. Those packets that follow the packet PA1 will still include other frames of the GOP structure (e.g. I frame, B frame and/or P frame). Hence, after the packets PA2-PA8 are received by the receiving unit 110, these packets will be preserved in the stream buffer 130 and wait for being decoded by the decoding device 30.

Figure 4:
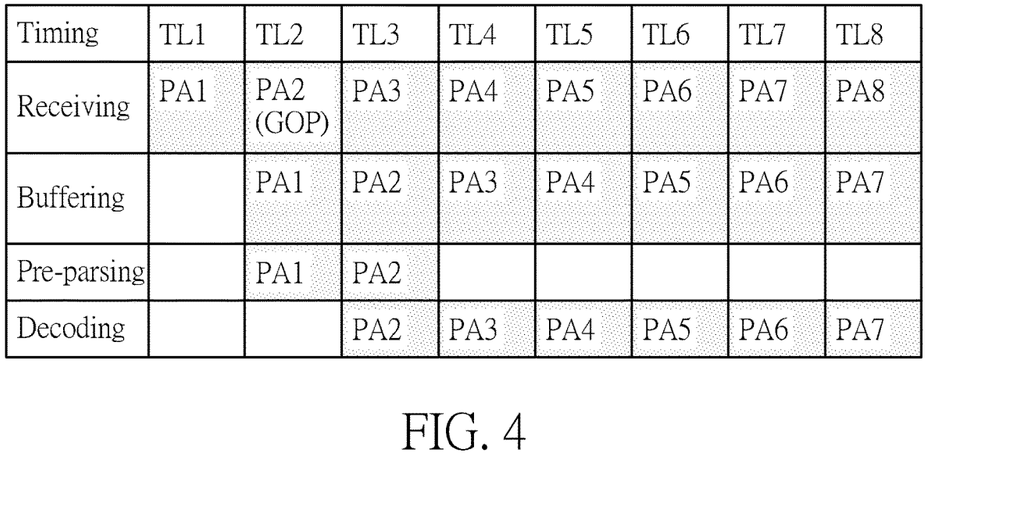

In an embodiment shown by FIG. 4, it is assumed that a first packet PA1 in the data stream DS does not include an I frame of a GOP structure but a second packet PA2 in the data stream DS does. At the beginning of operation, the buffer size of the stream buffer 130 is configured as VOL 1 and the processing rate at which the receiving unit 110 processes the data stream DS is configured as DR 1. In a first time slot TL1, the receiving unit 110 receives the packet PA1 in the data stream DS at the processing rate DR1. In a second time slot TL2, the packet PA1 is buffered by the stream buffer 130. Also, the buffer management unit 120 performs the pre-parsing operation on the packet PA1 buffered in stream buffer 130. According to a header of the packet PA1, the buffer management unit 120 parses out the packet PA1 does not include an I frame of a GOP structure. That is, the packet PA1 does not include video contents. Therefore, the buffer management unit 120 requests the stream buffer 130 to discard the packet PA1, which allows the decoding device 30 not to decode the packet PA1. Moreover, the packet PA2 that is received by the receiving unit 110 in the time slot TL2 will be buffered in the stream buffer 130 in a time slot TL3. Also, the packet PA2 will be pre-parsed by the buffer management unit 120 in the time slot TL3. According to a header of the packet PA2, the buffer management unit 120 parses out that the packet PA2 includes an I frame of a GOP structure and determines that the packet PA2 includes video/audio information that is required by the decoding device 30. Hence, the packet PA2 will be preserved and wait for being decoded by the decoding device 30. Since it is confirmed that the packet PA2 includes video contents, the buffer management unit 120 does not need to perform pre-parsing operations on the following packets. As a consequence, the following packets PA3-PA8 will be preserved in the stream buffer 130 after received by the receiving unit 110 and wait for being decoded by the decoding device 30.

Figure 5:
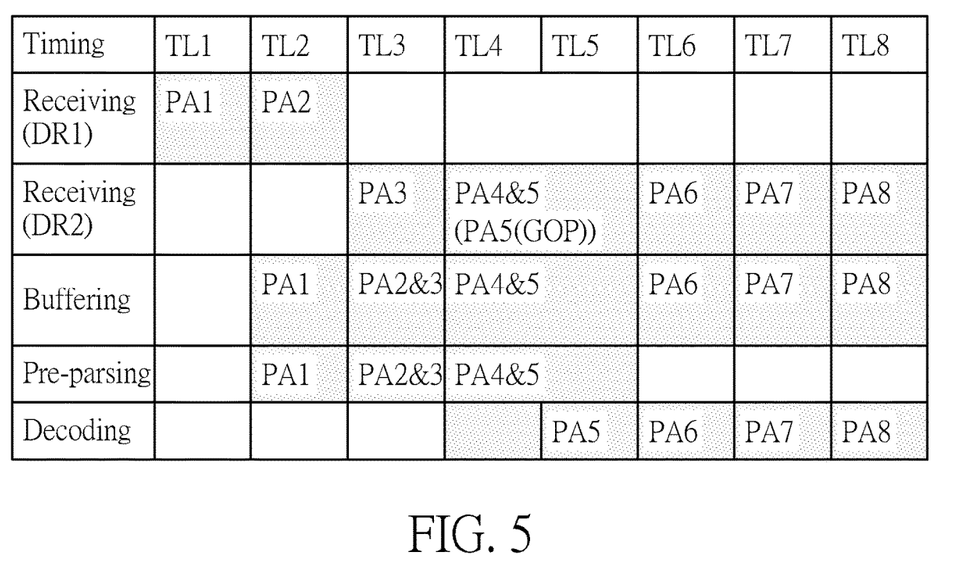

In an embodiment shown by FIG. 5, the method applied to the embodiment of FIG. 4 is further improved. Similarly, the first few packets PA1-PA4 in the data stream DS do not include I frames of a GOP structure, while the fifth packet PA5 includes the I frame of the GOP structure. At the beginning of operation, the buffer size of the stream buffer 130 is configured as VOL 1 and the processing rate at which the receiving unit 110 processes the data stream DS is configured as DR 1. In a first time slot TL1, the receiving unit 110 receives the packet PA1 of the data stream DS at the processing rate DR 1. In a second time slot TL2, the packet PA1 is buffered in stream buffer 130. At the time, the buffer management unit 120 performs a pre-parsing operation on the packet PA1 buffered in stream buffer 130. According to a header of the packet PA1, the buffer management unit 120 parses out that the packet PA1 does not include I frame of the GOP structure. Thus, the buffer management unit 120 requests the stream buffer 130 to discard the packet PA1, which allows the decoding device 30 not to decode the packet PA1. In addition to requesting the stream buffer 130 to discard the packet PA1, the buffer management unit 120 further requests the receiving unit 110 to increase the processing rate, thereby to obtain the data units that include video/audio information faster. At the time, the buffer management unit 120 also requests the stream buffer 130 to increase the buffer size in response to increased data amount in a unit of time that comes from the receiving unit 110. In a time slot TL3, the receiving unit 110 starts to receive the packets in the data stream DS at a higher processing rate DR2 (e.g. 4.88 MB/s). As the buffer size of the stream buffer 130 is increased to VOL2 (e.g. 6 MB). Therefore, the stream buffer 130 can keep the packets PA2 and PA3 at the same time. However, the buffer management unit 120 still does not find the packets that are associated with the video/audio information from the stream buffer 130 through the pre-parsing operations. In a time slot TL4, the buffer management unit 120 finds the video/audio information (I frame in a GOP structure) required by the decoding device 30 from the packets PA5 that is buffered in the stream buffer 130 through the pre-parsing operation. Therefore, the packet PA5 will be preserved and wait for being decoded by the decoding device 30. Afterwards, the stream buffer 130 requests the receiving unit 110 to operate at the original processing rate DR1. In addition, the stream buffer 130 could request the stream buffer 130 to reduce its buffer size to VOL1, thereby to save the system resources of the media playback device 10. Please note that the time when the buffer management unit 120 activates the adjustment mechanism (increasing/decreasing the processing rate of the receiving unit 110 as well as the buffer size of the stream buffer 130) may vary in various embodiments. Even though it is mentioned in the above embodiment that the buffer management unit 120 requests the receiving unit 110 to increase the processing rate and requests the stream buffer 130 to increase the buffer size after the time slot T2, while requests the receiving unit 110 to decrease the processing rate and requests the stream buffer 130 to decrease the buffer size after the time slot T4, the buffer management unit 120 still could activate the adjustment mechanism earlier or later according to various embodiments.

Figure 6:
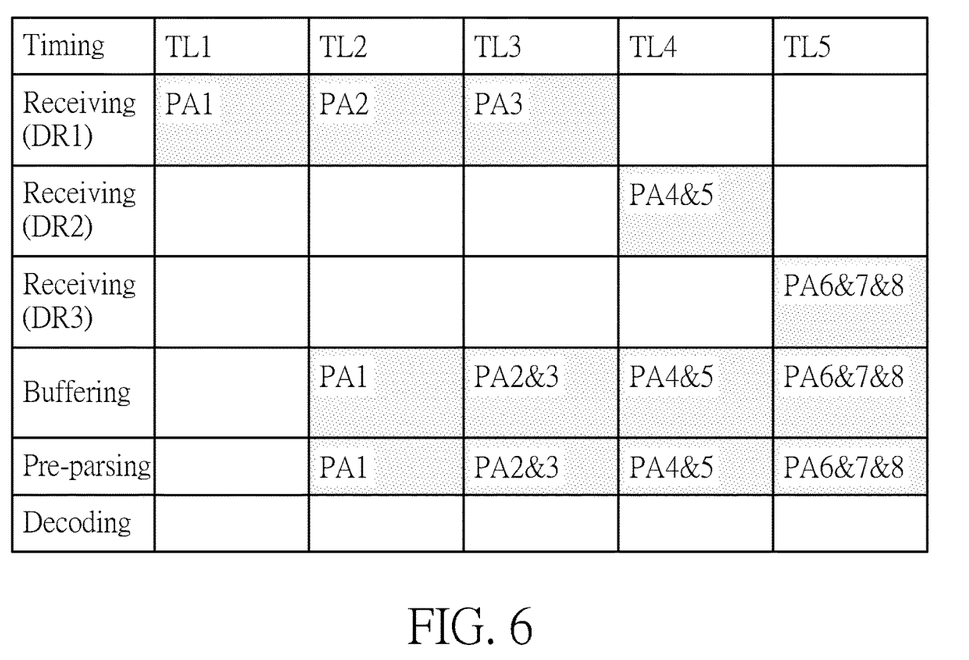

In an embodiment shown by FIG. 6, the receiving unit 110 receives the packets PA1-PA3 at the processing rate DR1 and these packets are buffered by the stream buffer 130. After a series of pre-parsing operations, the buffer management unit 120 does not find the video/audio information required by the decoding device 30 is included in the packets PA1-PA3. Therefore, the buffer management unit 120 requests the receiving unit 110 to increase the processing rate as well as requests the stream buffer 130 to discard the packets PA1-PA3, which allows the decoding device 30 not to decode the packets PA1-PA3. In addition, as the receiving unit 110 increases the processing rate, the buffer management unit 120 also requests the stream buffer 130 to increase the buffer size in response to increased data amount in unit of time that comes from the receiving unit 110. Moreover, in one embodiment, the buffer management unit 120 may not only request the receiving unit 110 to increase the processing rate, but also request the stream buffer 130 to decrease latency or idle time, thereby to increase a buffering rate at which the stream buffer 130 process the data stream DS. Accordingly, the receiving unit 110 starts to receive the packets PA4-PA5 at the processing rate DR2. In a time slot TL4, since the buffer size of the stream buffer 130 is increased to VOL2, the stream buffer 130 is able to keep the packet PA4 and PA5 at the same time. After the pre-parsing operations, the buffer management unit 120 still does not find the video/audio information required by the decoding device 30 is included in the packets PA4-PA5. Hence, the buffer management unit 120 requests the receiving unit 110 to again increase the processing rate and also requests the stream buffer 130 to discard the packets PA4-PA5 such that the decoding device 30 does not have to process the packets PA4-PA5. Additionally, as the receiving unit 110 increases the processing rate again, the buffer management unit 120 will also request the stream buffer 130 to increase the buffer size in response to increased data amount in a unit of time. In one embodiment, the buffer management unit 120 could again request the stream buffer 130 to decrease an idle time or latency during operation, thereby to increase the buffering rate at which the stream buffer 130 reads and stores the data stream DS. Accordingly, the receiving unit 110 receives the packets PA6-PA8 at the processing rate DR3 (e.g. 7.32 MB/s). In a time slot TL5, as the buffer size of the stream buffer 130 is increased to VOL3 (e.g. 9 MB/s), the stream buffer 130 can keep the packets PA6-PA8 at the same time. However, after performing the pre-parsing operations, the buffer management unit 120 still does not find any information in the packets PA6-PA8 is associated with video/image contents. Hence, the buffer management unit 120 requests the stream buffer 130 to discard the packets PA6-PA8 such that the decoding device 30 does not need to process the packets PA6-PA8.

In the above embodiment shown by FIG. 6, as the buffer management unit 120 keeps failing to find the video/audio information from the packets in the data stream DS, the buffer management unit 120 may repeatedly request the receiving unit 110 to increase the processing rate as well as request the stream buffer 130 to increase the buffer size until the processing rate reaches a maximum limit or the buffer size reaches a maximum limit. Please note that the time when the buffer management unit 120 activates the adjustment mechanism (increasing the processing rate of the receiving unit 110 and/or increasing the buffer size of the stream buffer 130) may vary in various embodiments. Even though the buffer management unit 120 requests the receiving unit 110 to increase the processing rate or the buffer management unit 120 requests the stream buffer 130 to increase the buffer size in the time slot TL2, the buffer management unit 120 may activate the adjustment mechanism earlier or later according to various embodiments.

Figure 7:
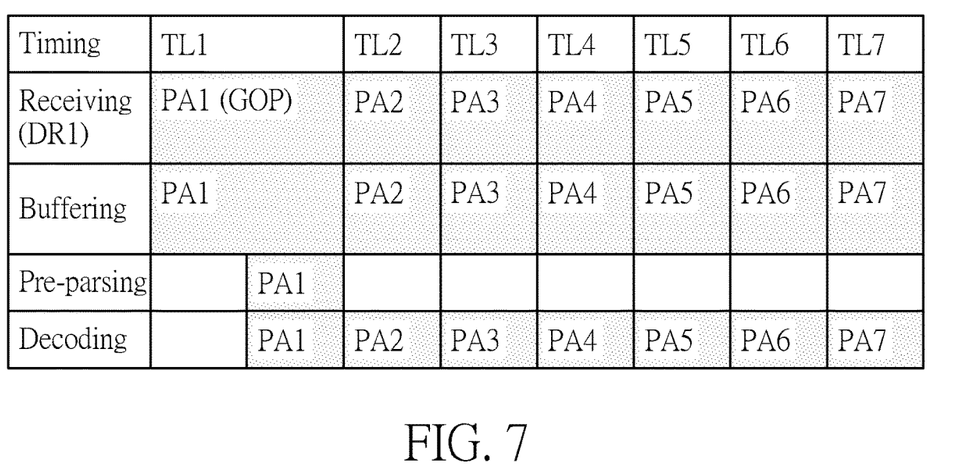

In an embodiment shown by FIG. 7, the packet PA1 in the data stream DS includes an I frame of a GOP structure. However, as status of the transmission between the video source and the media playback device 10 is poor, the data amount received by the download buffer 20 in the unit of time is not sufficient. For example, data of 2.44 MB is intended to be received in one second, but actually only 1.22 MB has been received in one second. That is, the receiving unit 110 does not receive an entire packet PA1 within a predetermined period of time (e.g. one time slot). At the moment, the buffer management unit 120 requests the stream buffer 130 to increase the idle time or the latency, in order to decrease the buffering rate. As a result, the stream buffer 130 takes a longer time in receiving and buffering data, such that the decoding device 30 will not perform a decoding operation on incomplete video data, thereby to avoid its operational efficiency downgraded.

Figure 8:
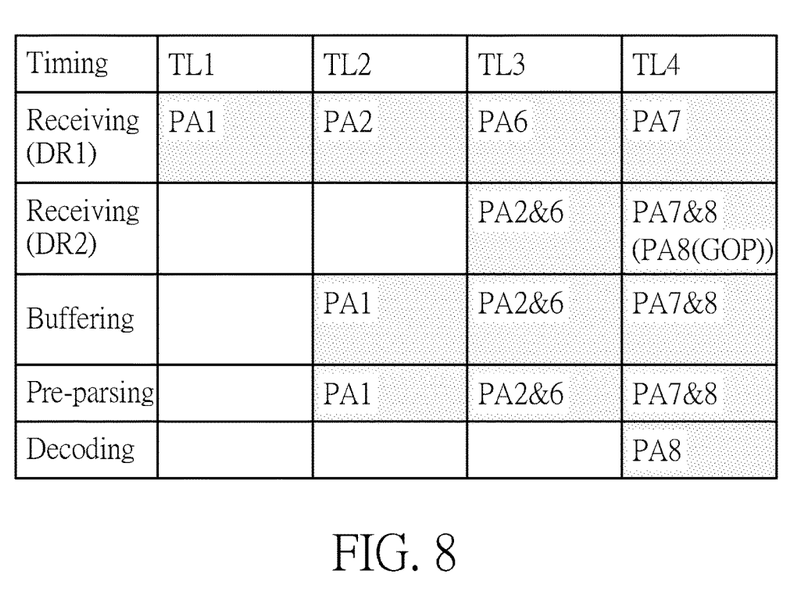

In an embodiment shown by FIG. 8, as status of the transmission between the video source and the media playback device 100 is decent, the transmission rate may be too fast for the receiving unit 110 to process data stored in the download buffer 20 in time. Therefore, some packets go missing during a certain period of time. The buffer management unit 120 could detect such condition in a time slot TL3 through the pre-parsing operation. Specifically, the buffer management unit 120 could detect such condition according to continuity among serial numbers of the packets buffered in the stream buffer 130 (by parsing information in headers of the packets). For example, the serial numbers of the packets PA2 and PA6 are not successive. At the moment, the buffer management unit 120 requests the receiving unit 110 to increase the processing rate, or request the stream buffer 130 to increase the buffering rate, thereby to avoid the packets going missing. Also, the buffer management unit 120 requests the stream buffer 130 to increase the buffer size, such that the stream buffer 130 is able to handle increased data amount in the unit of time that comes from the receiving unit 110. Until a time slot TL4, the buffer management unit 120 acknowledges that the packet PA8 contains an I frame of a GOP structure through the pre-parsing operation. Accordingly, the packet PA8 is preserved in the stream buffer 130 and will be later decoded by the decoding device 30.

Figure 9:
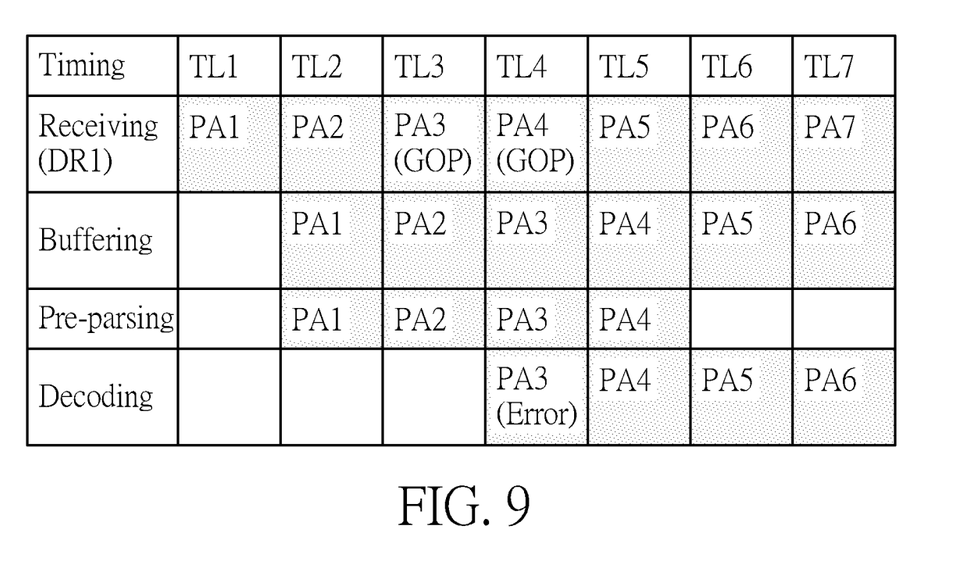

In an embodiment shown by FIG. 9, the packet PA3 contains the video/audio information (i.e., I frame of a GOP structure) that is required by the decoding device 30. However, when the decoding device 30 decodes the packet PA3 in a time slot TL4, an error occurs. Subsequently, the decoding device 30 reports an error message to the buffer management unit 120. After receiving the error message, the buffer management unit 120 requests the stream buffer 130 to stream buffer 130 to quicken the discarding of the packet PA3. For example, the buffer management unit 120 may request the stream buffer 130 to reduce the idle time or the latency, such as, reducing the sleep time of threads. As a result, the packet PA3 can be discarded immediately. Then, the buffer management unit 120 performs the pre-parsing operation on a next packet PA4, which includes the required video information. The packet PA4 will be preserved and wait for being decoded by the decoding device 30. In one embodiment, the decoding device 30 may encounter decoding errors that include (but not limited to): decode error, no header, error concealment, drop frame, CRC checksum error.

In conclusion, the method of controlling the stream buffer and the buffer device of the present invention performs a pre-parsing operation on buffered data units and accordingly determines whether the buffered data units include video information required by the decoding device of the media playback device. According to the pre-parsed result, the present invention selectively adjusts the processing rate at which the data stream is received and the buffering rate at which the data stream is buffered, such that the decoding device 30 can derive the required video/audio information from the data stream faster. Once the decoding device 30 derives the required video/audio information from the data stream, it is possible to adjust the processing rate for the data stream as well as the buffering rate for the data stream, thereby to reduce the usage of the system resources of the media playback device 10. This is because operations of units in the buffer device 100 (e.g. the receiving unit 110, the stream buffer 130 and the decoding device 30) take the usage of the system resources of the media playback device 10 (e.g. CPU time or memory space). In order to get a better power efficiency, it is necessary for the media playback device 10 to properly speed up, speed down or discard packets. In addition, when the pre-parsed result indicates that a data unit does not include the video/audio information that is required by the decoding device 30 of the media playback device 10, the data unit will be discarded from the stream buffer, thereby to avoid the decoding device 30 performing unnecessary decoding operation on the data units and also avoid wasting the system resources. When the status of the transmission between the media playback device 10 between video/audio sources is poor or decent, a reasonably overall adjustment on the processing rate of the data stream and the buffering rate of the data stream can avoid wasting the power. Hence, the system resources of the media playback device 10 can be allocated more reasonably via the adjustment mechanism of the present invention. The power efficiency can be improved without any hardware acceleration. In view of this, the present invention can apply to any system of high-end or low end CPU, such as Microprocessor without Interlocked Pipeline Stages (MIPS) architecture and Advanced RISC Machine (ARM) architecture.

Embodiments of the present invention can be implemented using hardware, software, firmware, and/or combinations thereof. Through an appropriate instruction execution system, embodiments of the present invention can be implemented using software or firmware stored in a memory. In terms of hardware, embodiments of the present invention can be implemented using any of the following technologies or a combination thereof: a separate logic having a logic gate capable of performing a logic function according to a data signal, and an application specific integrated circuit (ASIC), a programmable gate array (PGA), or a field programmable gate array (FPGA) having suitable combinational logics.

Flowcharts and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling a stream buffer in a media playback device, comprising:
   receiving a data stream from a download buffer of the media playback device at a processing rate;
   buffering the data stream into the stream buffer at a buffering rate;
   performing a pre-parsing operation on the data stream buffered in the stream buffer to obtain a pre-parsed result, comprising:
      pre-parsing a header of at least one data unit in the data stream; and
      determining whether the at least one data unit include video information according to information in the header of the at least one data unit, thereby to generate the pre-parsed result; and
   selectively adjusting at least one of the processing rate and the buffering rate according to the pre-parsed result.

2. The method of claim 1, wherein the step of determining whether the at least one data unit include video information according to information in the header of the at least one data unit comprises:
   determining whether the at least one data unit includes the video information according to whether or not the information in the header is associated with a certain type of frame of a group of pictures (GOP) structure.

3. The method of claim 1, wherein the step of selectively adjusting at least one of the processing rate and the buffering rate according to the pre-parsed result comprises:
   increasing the processing rate or increasing the buffering rate when the pre-parsed result indicates that the at least one data unit of the data stream does not include the video information; and
   increasing a buffer size when the processing rate is increased.

4. The method of claim 1, wherein the step of selectively adjusting at least one of the processing rate and the buffering rate according to the pre-parsed result comprises:
   increasing the processing rate or increasing the buffering rate when the pre-parsed result indicates multiple data units in the data stream are not successive.

5. The method of claim 1, further comprising:
   discarding the at least one data unit and not performing a decoding operation on the at least one data unit when the pre-parsed result indicates the at least one data unit in the data stream does not include the video information.

6. The method of claim 1, further comprising:
   when at least one data unit in the data stream is not completely received during a predetermined period of time, increasing an idle time or latency to decrease the buffering rate, thereby to avoid a decoding operation on the incomplete data unit.

7. The method of claim 1, further comprising:
   detecting a data amount that is received in a unit of time and accordingly adjusting the buffering rate.

8. The method of claim 1, further comprising:
   increasing a rate at which at least one data unit is discarded when a decoding error regarding the at least one data unit occurs.

9. A buffer device for use in a media playback device, comprising:
   a receiving unit, arranged to receive a data stream from a download buffer of the media playback device at a processing rate;
   a stream buffer, coupled to the receiving unit, arranged to buffer the data stream at a buffering rate; and
   a buffer management unit, coupled to the stream buffer and the receiving unit, arranged to perform a pre-parsing operation on the data stream buffered in the stream buffer to obtain a pre-parsed result and selectively adjust at least one of the processing rate and the buffering rate according to the pre-parsed result; wherein the buffer management unit is arranged to pre-parse a header of at least one data unit in the data stream; and determine whether the at least one data unit include video information according to information in the header of the at least one data unit, thereby to generate the pre-parsed result;
   wherein the data stream buffered in the stream buffer is provided to a decoding device of the media playback device for decoding process.

10. The buffer device of claim 9, wherein the buffer management unit is arranged to determine whether the at least one data unit includes the video information according to whether or not the information in the header is associated with a certain type of frame of a group of pictures (GOP) structure.

11. The buffer device of claim 9, wherein when the pre-parsed result indicates that the at least one data unit of the data stream does not include the video information, the buffer management unit requests the receiving unit to increase the processing rate or requests the stream buffer to increase the buffering rate; and when the receiving unit increases the processing rate, the buffer management unit requests the stream buffer to increase a buffer size.

12. The buffer device of claim 9, wherein when the pre-parsed result indicates multiple data units in the data stream are not successive, the buffer management unit requests the receiving unit to increase the processing rate or requests the stream buffer to increase the buffering rate.

13. The buffer device of claim 9, wherein when the pre-parsed result indicates the at least one data unit in the data stream does not include the video information, the buffer management unit requests the stream buffer to discard the at least one data unit, and the decoding device does not perform a decoding operation on the at least one data unit.

14. The buffer device of claim 9, wherein when the receiving unit does not completely receive a data unit in the data stream during a predetermined period of time, the buffer management unit requests the stream buffer to increase an idle time or latency to decrease the buffering rate, thereby to avoid the decoding device performing a decoding operation on the incomplete data unit.

15. The buffer device of claim 9, wherein the buffer management unit further detects a data amount that the buffer management unit received from the download buffer in a unit of time and accordingly request the stream buffer to adjust the buffering rate.

16. The buffer device of claim 9, wherein when the decoding device of the media playback device reports a decoding error regarding at least one data unit of the data stream, the buffer management unit requests the stream buffer to increase a rate at which the stream buffer discards the at least one data unit.

\* \* \* \* \*